(12) United States Patent
Clark et al.

(10) Patent No.: US 6,205,009 B1
(45) Date of Patent: Mar. 20, 2001

(54) METHOD AND APPARATUS FOR DETECTING FAULTS IN A RESOLVER

(75) Inventors: Aidan W. Clark; Kenneth F. Cook, both of Cincinnati; Robert D. Wittenbach, Lebanon; Deepak M. Kamath, Cincinnati, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/359,478

(22) Filed: Jul. 22, 1999

(51) Int. Cl.$^7$ ....................................... H02H 3/18
(52) U.S. Cl. .................................................. 361/78
(58) Field of Search .................... 361/78–87, 1

(56) References Cited

U.S. PATENT DOCUMENTS 3,654,516 * 4/1972 Traversi ................................. 361/78
5,910,875 * 6/1999 Tian et al. ............................. 361/78

* cited by examiner

Primary Examiner—Michael J. Sherry
(74) Attorney, Agent, or Firm—Andrew C. Hess; William Scott Andes

(57) ABSTRACT

A method for detecting fault in a resolver generating a sine voltage and a cosine voltage. The method includes obtaining a sum of a square of the sine voltage and a square of the cosine voltage. The sum is filtered through a first filter having a first time constant to generate a first filter output. The sum is also filtered through a second filter having a second time constant to generate a second filter output. The first filter output and second filter output are compared to detect a fault in the resolver.

15 Claims, 2 Drawing Sheets

METHOD AND APPARATUS FOR DETECTING FAULTS IN A RESOLVER

BACKGROUND OF THE INVENTION

The invention relates to detecting faults in a resolver and in particular to a method and apparatus for detecting faults in a resolver based on the sum of the squared outputs of the resolver. Resolvers are position sensing devices having one excitation winding and two output windings, namely a sine winding and a cosine winding. Due to the physical relationship between the two output windings and the excitation winding, the voltage amplitude of the sine winding is proportional to the sine of the resolver angle and the voltage amplitude of the cosine winding is proportional to the cosine of the resolver angle. Because of the proportionality of the sine and cosine winding voltage amplitudes, the sum of the square of the sine voltage and the square of the cosine voltage should equal a constant.

Existing systems compare the sum of squared cosine and sine voltages to range limits in order to detect sensor faults. The high and low range limits were set wide enough to account for all worst case system variables. As a result, these limits would only detect extreme sensor faults (e.g., electrical opens or shorts). Small signal drifts (e.g., series resistance, resistance to ground, etc.), referred to as soft faults, could produce significant sensed position error but not be detected by the sum of squares range test.

BRIEF SUMMARY OF THE INVENTION

An exemplary embodiment of the invention is directed to a method for detecting fault in a resolver generating a sine voltage and a cosine voltage. The method includes obtaining a sum of a square of the sine voltage and a square of the cosine voltage. The sum is filtered through a first filter having a first time constant to generate a first filter output. The sum is also filtered through a second filter having a second time constant to generate a second filter output. The first filter output and second filter output are compared to detect a fault in the resolver.

DETAILED DESCRIPTION OF THE INVENTION

Figure 1:
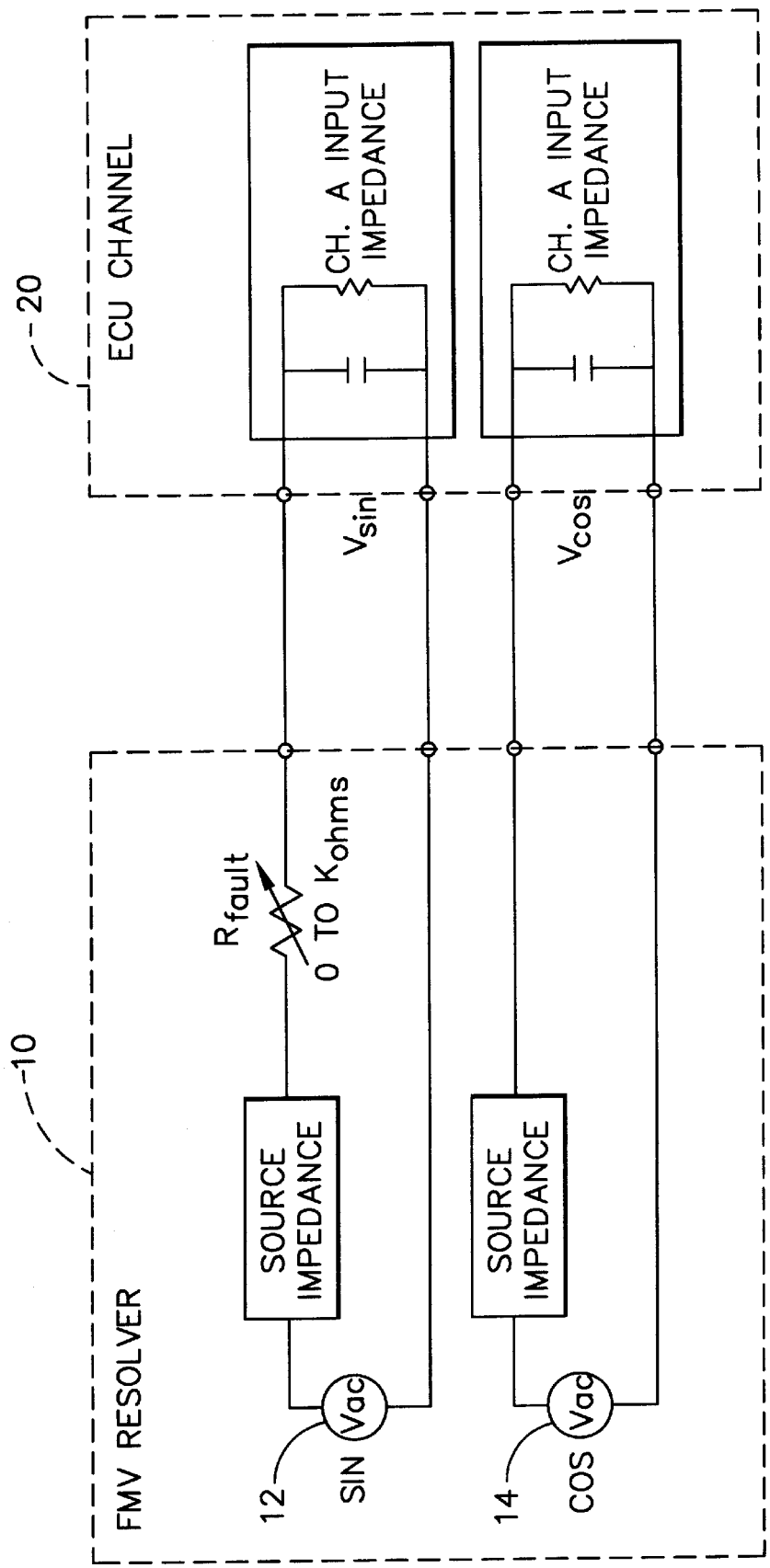
FIG. 1 is a block diagram of a resolver coupled to an electronic control unit.

FIG. 1 is a block diagram of a resolver 10 coupled to one channel (shown as channel A) of an electronic control unit 20. The resolver 10 includes a sine winding 12 which produces an output voltage V sin and a cosine winding 14 which produces an output voltage V cos. Ideally, the value $V \sin^2 + V \cos^2$ (or sum of squares value) should equal a constant for all resolver positions. FIG. 1 also depicts a fault shown as an added series resistance Rfault in the sine winding. The increased resistance may be due to an overstressed wire in the resolver 10 that is beginning to fracture. Using conventional detection methods, this type of fault would not be detected because it would not generate a large enough change in the sum of squares value to exceed the sum of squares range limits.

Figure 2:
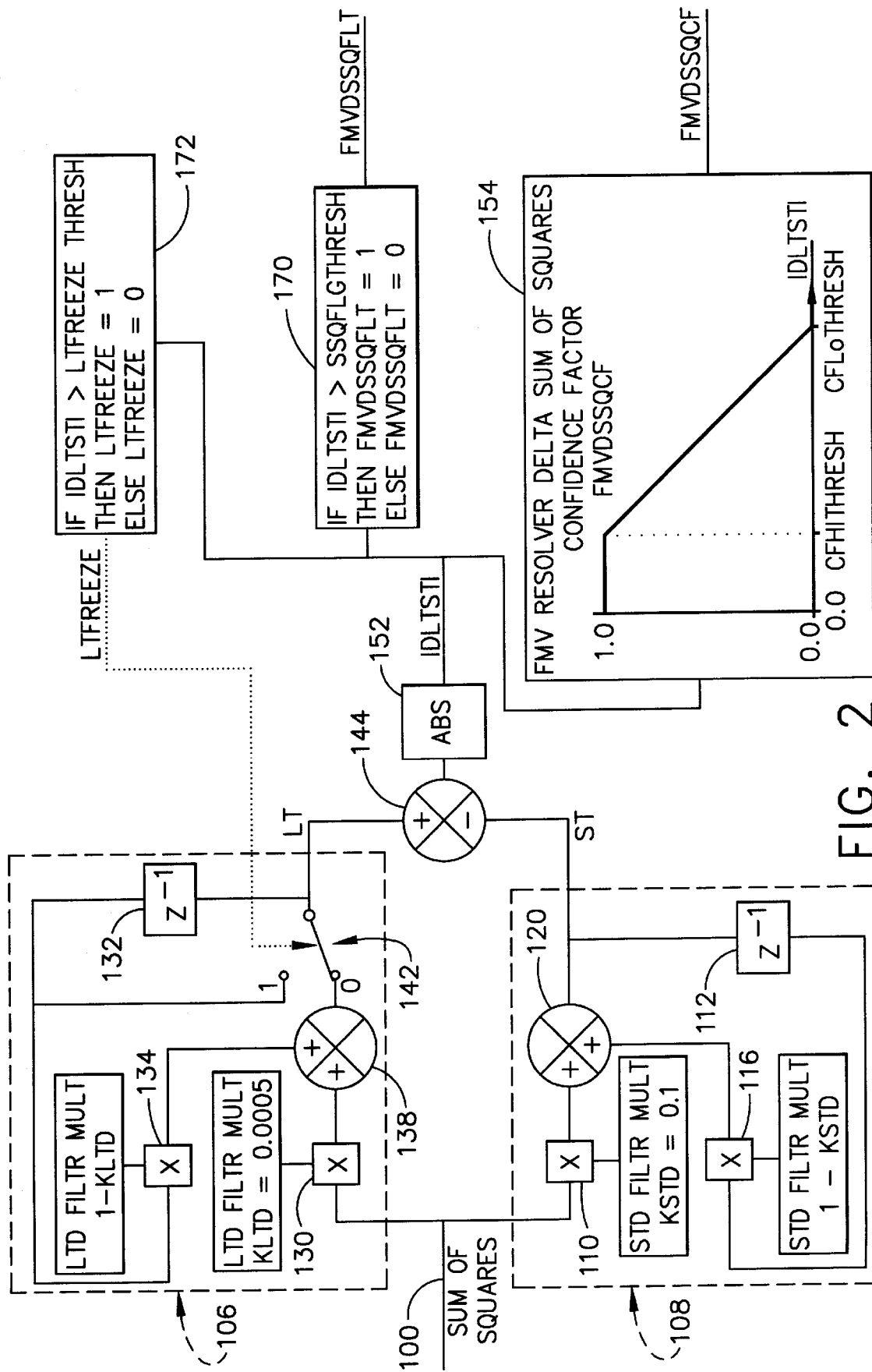
FIG. 2 is a block diagram of a circuit for detecting faults in a resolver in an exemplary embodiment of the invention.

FIG. 2 is a block diagram of a circuit for detecting faults in a resolver in an exemplary embodiment of the invention. As will be described in detail, the sum of squares value from a resolver is filtered by a long term filter and a short term filter. The long term filter is given a long time constant to act as a reference value which is indicative of a non-faulted sum of squares value to which subsequent sum of squares values can be compared. The short term filter is given a short time constant so that it closely follows the instantaneous sum of squares value but filters out the normal noise that occurs on the signal. These two filters can be varied to match the characteristics of a particular system.

As shown in FIG. 2, the sum of squares value (i.e., $V \cos^2 + V \sin^2$) is input at input terminal 100. The sum of squares value is provided to a long term filter 106 and a short term filter 108. At the short term filter 108, the sum of squares value is multiplied by a short term filter weight at multiplier 110. The short term filter weight is shown as KSTD and in an exemplary embodiment is 0.1. Short term filter 108 contains the previous short term sum of squares value in memory 112 which may be any storage device such as a register. The previous short term sum of squares value is applied to a multiplier 116 where the previous short term sum of squares value is multiplied by 1-KSTD. The outputs of multiplier 110 and multiplier 116 are provided to summer 120 to generate a first output in the form of a short term sum of squares value labeled ST. The short term filter generates a weighted average of the input sum of squares value and the previous short term sum of squares value to generate a current short term sum of squares value. The current short term sum of squares value is stored in memory 112 to be used as the previous short term sum of squares value for the next input value. The short term filter 108 may have a time constant of about 0.15 seconds. This enables the short term filter 108 to be responsive to changes in the input sum of squares value while preventing noise from corrupting the short term sum of squares value.

The long term filter 106 operates in a similar manner to the short term filter 108. At the input to long term filter 106, the sum of squares value is multiplied by a filter weight at multiplier 130. The filter weight is labeled KLTD and in an exemplary embodiment is 0.0005. Long term filter 106 contains the previous long term sum of squares value in memory 132 which may be any storage device such as a register. The previous long term sum of squares value is applied to a multiplier 134 where previous long term sum of squares value is multiplied by 1-KLTD. The outputs of multiplier 130 and multiplier 134 are provided to summer 138 to generate a second output in the form of a long term sum of squares value labeled LT. The long term filter generates a weighted average of the input sum of squares value and the previous long term sum of squares value to generate a current long term sum of squares value. The current long term sum of squares value is stored in memory 132 to be used as the previous long term sum of squares value for the next input value. The long term filter 106 may have a time constant of about 30 seconds.

The difference between the short term sum of squares value and the long term sum of squares value is determined at summer 144 and is shown as DLTST. The difference from summer 144 is applied to an absolute value unit 152. The absolute value of the difference between the short term sum of squares value and the long term sum of squares value is used to detect faults and to generate a confidence factor associated with the resolver. The absolute value from absolute value unit 152 is provided to a confidence factor generator 154 which generates a confidence factor ranging from zero to one. An exemplary relationship between the absolute value of DLTST and the confidence factor is shown in FIG. 2. The plot indicates that the confidence factor linearly decreases from 1 to 0 as the absolute value of DLTST increases from CFHiThresh (0.06 in an exemplary embodiment) and CFLoThresh (0.12 in an exemplary embodiment). The confidence factor generator 154 may be implemented using a look-up-table. The confidence factor indicates the degree of reliability associated with a resolver. In systems having redundant resolvers, the confidence factor may be used to proportion signals generated by multiple resolvers.

The output of absolute value unit 152 is also provide to comparator 170 where the absolute value of the DLTST is compared to a first threshold labeled SSQFLGThresh. In an exemplary embodiment, the first threshold is 0.12. If the absolute value of DLTST exceeds the first threshold, a fault signal is generated which is labeled FMVDSSQFLT. The fault signal may be provided to an operator to indicate that the resolver is in need of service. The output of absolute value unit 152 is also applied to comparator 172 where the absolute value of the DLTST is compared to a second threshold labeled LTfreezeThresh. In an exemplary embodiment, the second threshold is 0.08. If the absolute value of DLTST exceeds the second threshold, a freeze signal is generated which is labeled LTfreeze. When the freeze signal is provided to switch 142, switch 142 disconnects summer 138 from summer 144 and connects memory 132 to summer 144. This freezes or holds the long term sum of squares value to the value in memory 132 and prevents the long term sum of squares value from being corrupted by faulted input sum of squares values.

The first and second thresholds used to detect faults and freeze the long term threshold need to be set so as to accommodate normal shifts in the sum of squares value. Ideally, the sum of squares value is constant. Practically, however, during normal operation the sum of squares value can drift due to excitation amplitude variations, transformation ratio variations and time skew between the sampling of V sin and V cos. Thus, the thresholds must discriminate between shifts indicating fault conditions and shifts due to normal operation.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for detecting fault in a resolver generating a sine voltage and a cosine voltage, the method comprising:
   obtaining a sum of a square of the sine voltage and a square of the cosine voltage;
   filtering said sum through a first filter having a first time constant to generate a first filter output;
   filtering said sum through a second filter having a second time constant to generate a second filter output; and,
   comparing said first filter output and said second filter output to detect a fault in the resolver.

2. The method of claim 1 wherein:
   said second time constant is greater than said first time constant.

3. The method of claim 1 wherein said comparing includes:
   obtaining a difference between said first filter output and said second filter output; and
   comparing said difference to a threshold.

4. The method of claim 1 wherein said comparing includes:
   obtaining a difference between said first filter output and said second filter output;
   determining an absolute value of said difference; and,
   comparing said absolute value to a threshold.

5. The method of claim 1 further comprising:
   generating a confidence value in response to said comparing.

6. The method of claim 3 further comprising:
   maintaining said second output at a fixed value when said difference exceeds said threshold.

7. The method of claim 1 wherein:
   said first filter output is a weighted average of said sum over a first period of time defined by said first time constant.

8. The method of claim 1 wherein:
   said second filter output is a weighted average of said sum over a second period of time defined by said second time constant.

9. An apparatus for detecting fault in a resolver generating a sine voltage and a cosine voltage, the apparatus comprising:
   a first filter for filtering a sum of a square of the sine voltage and a square of the cosine voltage, said first filter having a first time constant to generate a first filter output;
   a second filter for filtering the sum of a square of the sine voltage and a square of the cosine voltage, said second filter having a second time constant to generate a second filter output; and,
   comparison circuitry for comparing said first filter output and said second filter output to detect a fault in the resolver.

10. The apparatus of claim 9 wherein:
    said second time constant is greater than said first time constant.

11. The apparatus of claim 9 wherein said comparison circuitry includes:
    a summer for obtaining a difference between the first filter output and the second filter output; and
    a comparator for comparing said difference to a threshold.

12. The apparatus of claim 9 wherein said comparison circuitry includes:
    a summer for obtaining a difference between the first filter output and the second filter output;
    an absolute value unit for generating an absolute value of said difference; and,
    a comparator for comparing said absolute value to a threshold.

13. The apparatus of claim 9 further comprising:
    a confidence factor generator for generating a confidence value in response to said comparison circuitry.

14. The apparatus of claim 9 wherein:
    said first filter output is a weighted average of said sum over a first period of time defined by said first time constant.

15. The apparatus of claim 9 wherein:
    said second filter output is a weighted average of said sum over a second period of time defined by said second time constant.

* * * * *